United States Patent [19]

Grant et al.

[11] Patent Number: 4,755,669

[45] Date of Patent: Jul. 5, 1988

[54] VACUUM MONITORING APPARATUS

[75] Inventors: Robert B. Grant, Middlewich; Joseph P. R. Jullien, Knutsford, both of United Kingdom

[73] Assignee: VG Instruments Group Limited, United Kingdom

[21] Appl. No.: 16,014

[22] Filed: Feb. 18, 1987

[30] Foreign Application Priority Data

Feb. 18, 1986 [GB] United Kingdom ............... 8603999

[51] Int. Cl.$^4$ .............................................. B01D 59/44
[52] U.S. Cl. .................................. 250/288; 250/281; 315/111.91
[58] Field of Search ............... 250/281, 285, 288, 427, 250/388, 374; 315/111.91

[56] References Cited

U.S. PATENT DOCUMENTS

| | | | |
|---|---|---|---|
| 2,758,233 | 8/1956 | Nelson | 315/111.91 |
| 3,267,326 | 8/1966 | Hayward et al. | 315/111.91 |
| 3,319,117 | 5/1967 | Wheeler | 315/111.91 |
| 3,361,340 | 1/1968 | Brubaker | 315/111.91 |
| 3,723,729 | 3/1973 | Kruger et al. | 250/427 |
| 3,761,708 | 9/1923 | Roepke et al. | 250/427 |
| 4,251,725 | 2/1981 | Adkisson | 250/281 |

Primary Examiner—Bruce C. Anderson
Attorney, Agent, or Firm—Bacon & Thomas

[57] ABSTRACT

The invention provides a wide range pressure gauge comprising a thermal-conductivity gauge and a high-vacuum total or partial pressure gauge such as a hot-cathode ionization gauge or a residual gas mass spectrometer, mounted from a common flange. In order to allow the use of a filament (3) shorter than those conventionally used in thermal conductivity pressure gauges, means (49–54) are provided to maintain the filament temperature substantially constant over its entire pressure range. Pressure is measured by means (51, 52, 56–58) adapted to measure the power dissipated in the filament (3).

20 Claims, 6 Drawing Sheets

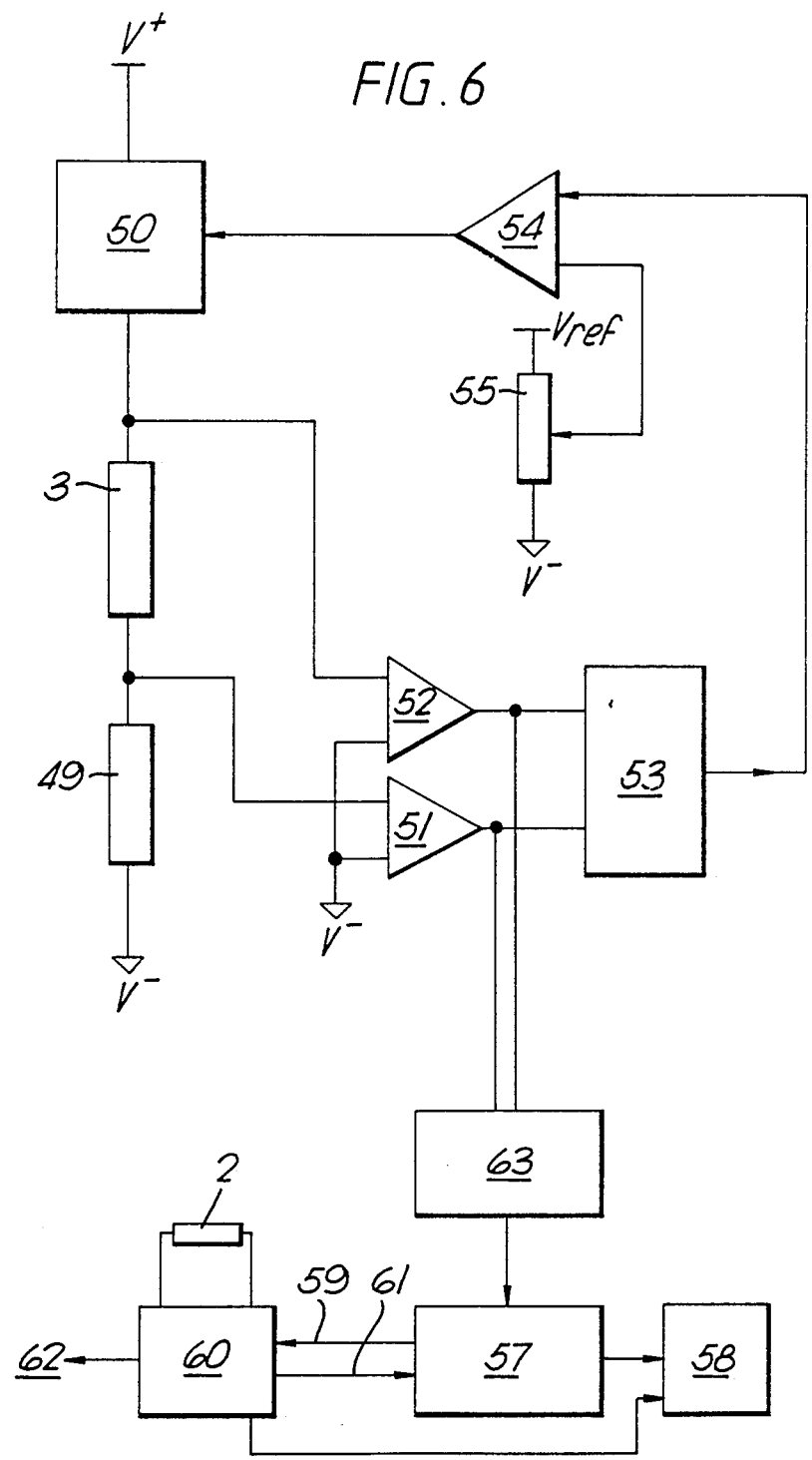

VACUUM MONITORING APPARATUS

This invention relates to apparatus for monitoring the pressure of gases in a chamber maintained substantially below atmospheric pressure, for example in the range $10^{-10}$ to 10 torr, and optionally for determining the composition of those gases over part of that range.

Several different types of vacuum gauge are conventionally used for monitoring pressure in the range $10^{-10}$ to 10 torr. Between $10^{-10}$ and $10^{-3}$ torr, hot cathode ionization gauges are often used while from $10^{-3}$ torr to 10 torr, thermal conductivity gauges, eg Pirani or thermocouple gauges, can be used. Below $10^{-3}$ torr it is frequently desirable to measure the partial pressures of the gases as well as their total pressure, and a small mass spectrometer, usually of the quadrupole type, provides a convenient way of doing this. The mass spectrometer can also be used to determine the total pressure of the gases (see, eg, U.S. Pat. No. 4,535,236), obviating the need for an additional ionization gauge.

A very common requirement for different types of pressure gauge exists on a vacuum vessel evacuated by a high vacuum pump such as a diffusion pump. In such a system, the maximum pressure which can be tolerated without damage to the pump is typically $10^{-3}$ torr, which coincides with the upper pressure limit of a hot-cathode ionization gauge or a residual gas analyser (RGA) such as a mass spectrometer. Consequently, a hot-cathode ionization gauge or RGA mass spectrometer is provided to monitor total or partial pressure, respectively, in the evacuated vessel. A mechanical rotary pump is also necessary to maintain the pressure in the backing line to the diffusion pump at $10^{-1}$ torr or less, and it is conventional to use a Pirani type thermal conductivity gauge for monitoring the pressure in the backing line. Therefore a combined control unit is provided for both gauges, but the ionization gauge head or mass spectrometer is mounted on the vacuum vessel and the Pirani gauge head on the diffusion pump backing line. Such a control unit conventionally incorporates protection circuits which prevent the diffusion pump and ionization gauge or mass spectrometer from being switched on if the backing pressure exceeds the safe value for the diffusion pump, and which turn off the ionization gauge or mass spectrometer if the indicated total pressure rises above a preset value, typically $10^{-3}$ torr. In such a system it is not necessary to provide a Pirani-type gauge directly on the vacuum vessel because if the diffusion pump is not operating, the pressure in the vessel will be approximately the same as the pressure indicated on the backing line Pirani gauge.

There are a number of applications, however, where it is necessary sometimes to operate a vacuum vessel at pressures up to 10 torr and at other times at pressures less than $10^{-3}$ torr, and to provide residual gas analysis at the lower pressures. In these cases it has been necessary up to now to provide two separate gauges, a Pirani-type gauge and a hot-cathode ionization gauge or mass spectrometer, mounted on separate ports on the vacuum vessel. A combined Pirani gauge and ionization gauge or mass spectrometer on a single small flange has not been developed, chiefly because the physical size of both gauges prevents them being fitted on a flange conventionally used for one of them.

Conventional Pirani-type thermal conductivity gauges comprise a thin filament heated to a temperature of 200°–300° C. by means of an electrical current which is maintained constant. Conduction of heat from the filament to a nearby heat sink (maintained at a lower temperature than the filament) is dependent on the thermal conductivity of the gas surrounding the filament and hence its pressure. If the gas pressure increases, the increased heat conduction tends to reduce the temperature of the filament and reduces its resistance, which causes the voltage across it to fall. Thus the voltage across the filament can be used as a measure of the pressure. The technique is only successful if the filament is long enough to ensure that its temperature is substantially constant over the greater part of its length. Heat losses by conduction through the supports of the filament will cause a temperature gradient to exist between the central portion of the filament and its ends, and the proportion of heat lost through these supports relative to that lost by conduction through the gas must be small. If it is not, the gauge will be insensitive and non-linear, because the proportion itself will vary with the temperature of the filament. Thus, as the temperature of the filament increases due to a fall in pressure of the gas, the heat lost through the mountings will also increase, limiting the temperature rise to a value less than that due to conduction through the gas alone.

In conventional gauges, therefore, the filament is relatively long, typically 50–100 mm, so that the proportion of the heat lost through the mountings is small compared to that lost through the gas in the operable pressure range, and the change in the amount of heat lost through the mountings is insignificant. Typically, the filament will be disposed axially in a hollow tube which serves as the heat sink. Pirani gauges operating on this principle are therefore fairly large, and this has up to now precluded the manufacture of a wide-range vacuum monitor comprising either an ionization gauge or mass spectrometer and a Pirani gauge mounted on a single small vacuum flange. Typically the ionization gauge or mass spectrometer occupies virtually all the space available on a standard 38 mm diameter flange. It is the object of the present invention to provide apparatus for monitoring gas pressure incorporating a high vacuum gauge such as a hot cathode ionization gauge or an RGA mass spectrometer and a thermal conductivity pressure gauge in which this problem is overcome, permitting the two gauges to be mounted from a single flange no bigger than required by the high vacuum gauge itself.

The invention provides apparatus adapted to measure the pressure of gases in a chamber maintained substantially below atmospheric pressure, comprising:

(a) a first filament, maintained at a temperature at which it emits electrons and mounted from a vacuum flange adapted to fit a port on said chamber;

(b) means for collecting at least some of the ions formed by collision of said electrons with molecules of said gases;

(c) a second filament mounted from said flange and adapted for use as the sensing element of a thermal conductivity pressure gauge;

(d) means for passing an electrical current through said second filament;

(e) means for producing respective signals indicative of the magnitudes of the current and potential difference across said second filament;

(f) control means responsive to said signals and arranged to vary said second filament current so that the quotient of said potential difference and said current is maintained substantially constant;

(g) means responsive to said signals and arranged to produce therefrom an output signal indicative of the total pressure of said gases.

Preferably also, means are provided for preventing operation of the first filament when the output signal is indicative of a pressure greater than a predetermined level.

In a simple embodiment of the invention the output signal may be produced by multiplying the signals indicative of the current in the second filament and the potential difference across it, so that the output signal is indicative of the power dissipated in the filament, which is related to the pressure of the gas surrounding it, as explained below.

In one embodiment of the invention the first filament and the means for collecting ions comprise a conventional hot cathode ionization gauge, but preferably they form part of a residual gas analyser such as a quadrupole mass spectrometer. In this case a quadrupole mass analyser may be provided between an ion source comprising the first filament and the means for collecting ions, which is typically an electron multiplier or a Faraday collector. In both embodiments, suitable control units for the ionization gauge or mass spectrometer will be provided. The residual gas analyser may be used as both a partial pressure and total pressure monitor below about $10^{-3}$ torr, as explained.

By controlling the current in the second filament so that the quotient of the potential difference across it and the current through it is substantially constant, the resistance of the filament is maintained substantially constant. In this way the temperature of the filament also remains constant, so that the proportion of heat conducted from it through its mountings is constant, unlike the conventional Pirani gauge in which the temperature of the filament varies. In the gauge of the invention, therefore, it is possible to tolerate a much higher proportion of heat loss through the filament mountings without adversely affecting the linearity and sensitivity of the gauge, because this heat loss is a constant quantity. This enables the use of a much shorter filament than a conventional Pirani-type gauge, which in turn enables a thermal conductivity gauge filament to be incorporated on the same vacuum flange as an ionization gauge or a residual gas mass spectrometer.

In a conventional Pirani type gauge, it is the variation in temperature of the filament with the changing pressure of gas which results in a change in resistance. The resistance of the filament is monitored by measuring the voltage across it when a constant current is supplied (or v.v), and relating this to a change in gas pressure by calibration. In the gauge of the invention, however, the temperature of the filament may be maintained substantially constant and changes in thermal conductivity of the surrounding gas are detected by measuring the power dissipated by the filament, that is, the product of the potential difference across it and the current flowing through it. For example, an increase in gas pressure will result in increased heat loss from the filament, and consequently the power dissipated in it will be increased by the action of the control unit to maintain the temperature. The change in power dissipation can be related to the change in gas pressure by calibration.

According to another feature of the invention, the provision of a thermal conductivity gauge on the same flange as an ionization gauge or mass spectrometer provides a very convenient way of protecting the filament of the ionization gauge or spectrometer against accidental damage by attempted operation when the pressure in the vacuum vessel is too high. Means are provided to prevent power being applied to the first filament if the output signal of the thermal conductivity gauge is such that the pressure in the vessel is above a safe level. This can be achieved by a conventional trip circuit similar to those used in the combined ionization gauge/Pirani gauge control unit previously described. The trip level is set at a predetermined level above which it is considered unsafe to operate the first filament, or at any other level below this if desired. Additional trip circuits, operating at that level or at any other predetermined levels, may also be provided to control other equipment associated with the apparatus. These may be triggered either from the high vacuum gauge or the thermal conductivity gauge, as required.

In general it is unnecessary for the thermal conductivity gauge and the high vacuum gauge of the apparatus to operate simultaneously, but this possibility is not excluded from the invention. Usually, a controller will be provided which on being switched on will operate in the thermal conductivity gauge mode. The high vacuum mode will be enabled, automatically if desired, once the pressure as monitored by the thermal conductivity gauge has fallen below the predetermined level. When the high vacuum gauge is operating, the thermal conductivity gauge is no longer required because the high vacuum gauge will indicate any dangerous increase in pressure as soon as it begins to occur, and can be adapted to operate its filament trip. This feature is standard in many conventional ionization gauges. An exception to this may arise if the high vacuum gauge is a mass spectrometer which can be set to monitor only a small mass range and in which no independent monitoring of the total ion current is provided. In this case, no direct protection of the mass spectrometer filament will be available and simultaneous operation of the thermal conductivity gauge can provide a useful measure of protection for the mass spectrometer filament.

In a preferred embodiment, a quadrupole mass analyser is disposed between said means for collecting ions and an electron impact ion source which comprises an ion chamber and said first filament, and said second filament is disposed adjacent to the wall of said ion chamber. Many mass spectrometers adapted for residual gas analysis have electron impact ion sources which are adapted to operate with either of two electron emitting filaments, the second of which is provided as a back-up for the first in case of failure. For many applications, the second filament may be dispensed with and replaced by the second filament of the invention to provide a thermal conductivity vacuum gauge. In this embodiment, the wall of the ion chamber of the electron impact ion source serves as the heat sink required for the operation of the thermal conductivity gauge. In this way a very compact combined gauge can be provided with only minor modification of the spectrometer.

In the case of combination of the second filament of the invention with an ionization gauge, a heat sink is provided adjacent to the filament. In many cases, a rigid support conductor for an end of the filament remote from the flange will serve as a heat sink. Many conventional ionization gauges comprise a tubular metallic shield around the electrodes, or are designed to fit into a tube-like port on the vacuum vessel. No additional heat sink is required with gauges of this type. If the construction of the gauge is such that the filament support cannot be used as the heat sink and no shield is present, an additional heat sink, for example a metal plate secured to the mounting flange of the gauge disposed adjacent to the filament, should be provided.

Ionization gauges incorporating more than one filament, the second of which serves as a back-up to the first, are also common. In such a gauge, the second filament of the invention may simply replace the back-up filament, again minimizing the modifications to the gauge itself.

Preferably the filaments used for the thermal conductivity gauge of the invention comprise a 60 mm length of gold-plated tungsten wire formed into a small diameter coil of 10–40 turns and about 10 mm in length. Such a filament is typically operated at 300° C. and results in a measurable pressure range of $8 \times 10^{-3}$ to 10 torr. It can easily be incorporated in the ion source of the mass spectrometer. Other types of filament may of course be employed, dependent on the pressure range required and the physical construction of the gauge.

The components of the mass spectrometer or ionization gauge incorporated in the invention are conventional and need not be described in detail.

Preferred embodiments of the invention will now be described by way of example and with reference to the drawings, in which:

FIG. 6 is a block diagram of an alternative control system suitable for use with the invention.

Figure 1:
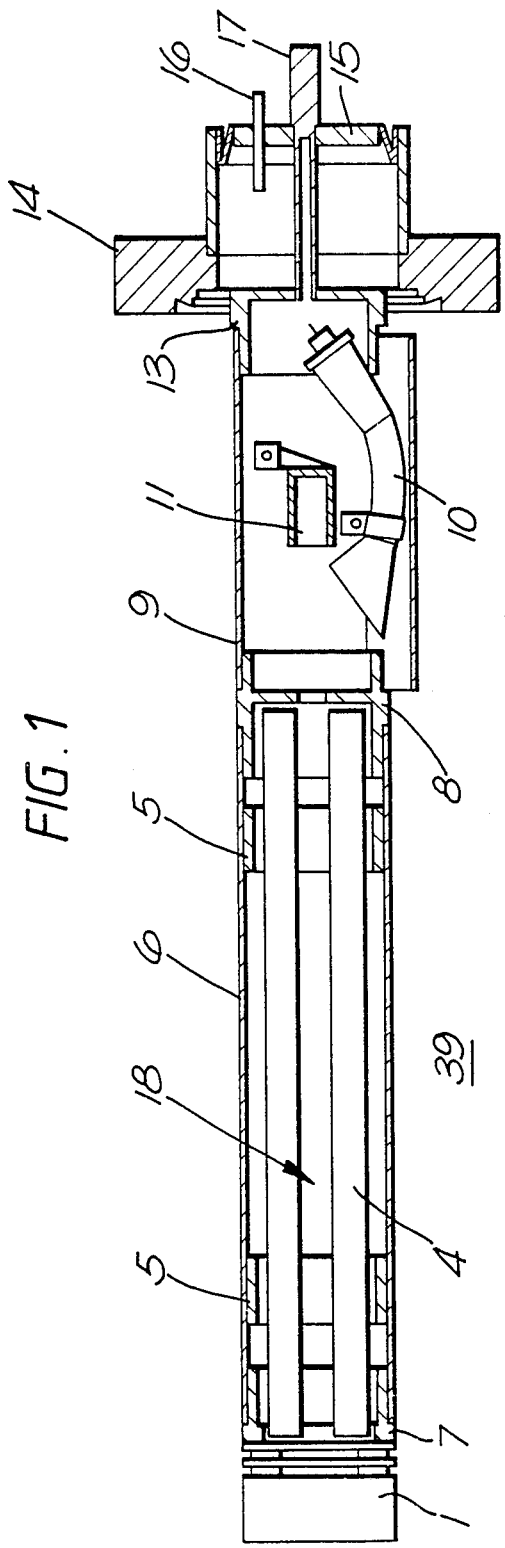
FIG. 1 is a general view of a gauge according to the invention comprising a residual gas analyser of the quadrupole type.
Figure 2:
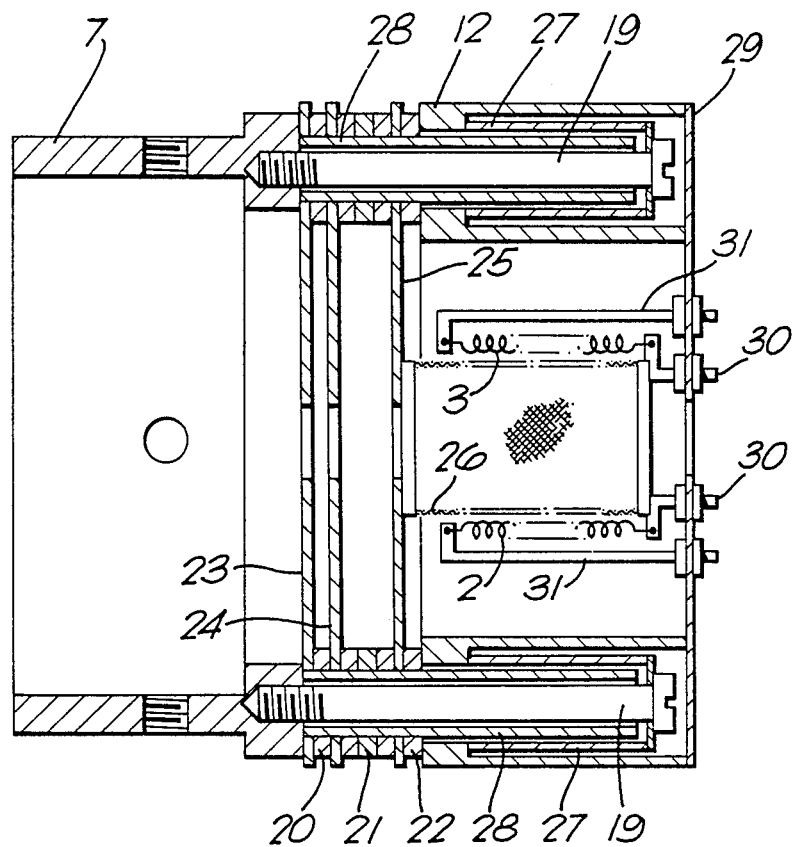
FIG. 2 is a sectional view of the ionization source of the gauge shown in FIG. 1.
Figure 3:
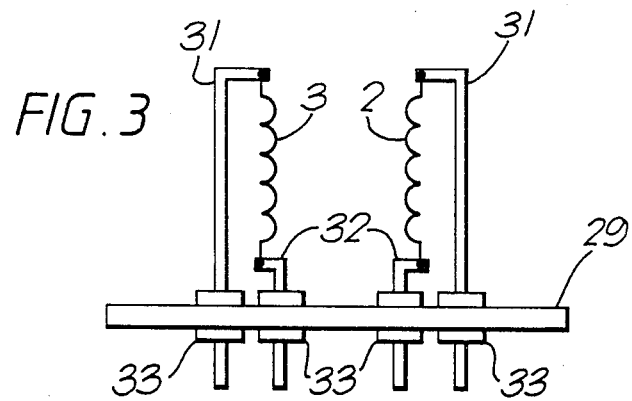
FIG. 3 is a view of part of the ionization source shown in FIG. 2.

Referring first to FIG. 1, an electron impact ionization source 1, described in detail below, comprises an electron emitting filament 2 and a thermal-conductivity gauge filament 3 (FIGS. 2 and 3). Ionization source 1 is fitted to a support tube 6 by an adapter 7, and tube 6 contains a quadrupole mass analyser 18 comprising four electrodes 4 supported by two insulators 5. An adaptor 8 secures tube 6 to a housing 9 which is in turn attached to a base member 13 on a mounting flange 14. Flange 14 is a conventional high-vacuum type flange and is used to mount the gauge on the process chamber containing the gases to be monitored. It incorporates a vacuum tight electrical plug 15 comprising several pins 16 and a central spigot 17 which is used to connect the electrical supplies to the gauge. An electron multiplier 10 and Faraday collector 11 are provided in housing 9.

When the gauge is used as a conventional quadrupole mass spectrometer, the gas in the process chamber 39 in which the gauge is situated is ionized in source 1 by electrons produced by filament 2, and the ions so produced are mass analysed by quadrupole mass analyser 18. Ions emerging from analyser 18 strike Faraday collector 11, giving an output signal accurately proportional to the partial pressure of the gases whose ions have been selected by analyser 18. Alternatively, ions from the analyser can be diverted into electron multiplier 10, which results in greater sensitivity at the expense of reproducibility and accuracy of measurement.

Referring next to FIG. 2, source chamber 12 of source 1 is attached to adaptor 7 by means of screws 19 and spaced from it by insulators 20–22. An electrode 23, which contains the ion exit aperture of the source, and a focusing electrode 24 are also supported on insultors 20–22 as shown. The ion chamber itself comprises wall 26 which is made of a cylindrical mesh mounted on a support electrode 25. Insulating spacers 27 are fitted between source chamber 12 and the heads of the screws 19, and insulating tubes 28 are fitted over the screws as shown.

The end of source chamber 12 is closed by filament support plate 29 which carries electron emitting filament 2 and thermal-conductivity gauge filament 3.

As shown in FIG. 3, each filament is fixed between filament supports 31 and 32, each of which is mounted on an insulated feedthrough 33 in plate 29. Electrical connections to the filaments are made through barrel connectors (not shown) attached to the ends 30 of the supports 31 and 32. When the gauge is used as a conventional mass spectrometer, filament 3 is not used. Filament 2 is maintained at a temperature at which it emits electrons so that ionization source 1 functions as a conventional electron impact ionization source.

When the gauge is used as a thermal-conductivity pressure gauge, all the components of ionization source 1, except filament 3, are maintained at a fixed potential $V-$. Filament 3 is operated in the manner described below and source chamber 12 and the cylindrical mesh comprising wall 26 serve as heat sinks, required for the operation of filament 3 as a thermal-conductivity pressure gauge.

The electron emitting filament 2 is identical to the filament used in a conventional electron-impact ionization source. The thermal-conductivity gauge filament 3 typically comprises a 60 mm length of 0.05 mm diameter gold plated tungsten wire formed into a small diameter coil containing approximately 20 turns and about 10 mm long, fitted between filament supports 31 and 32, as shown in FIG. 3.

Figure 4:
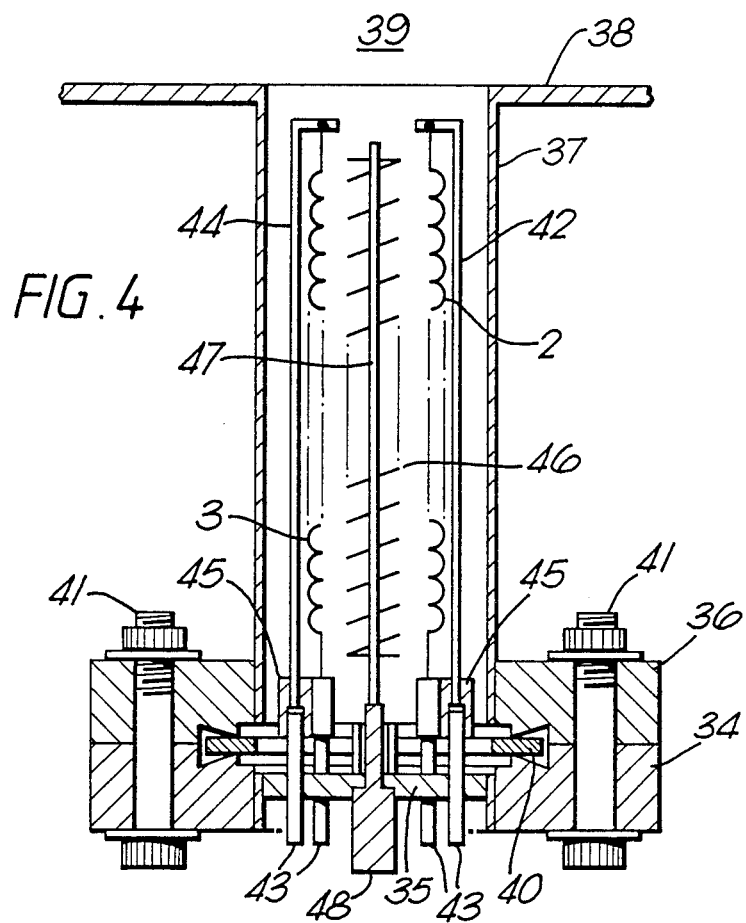
FIG. 4 is a view of a gauge according to the invention comprising an ionization gauge.

FIG. 4 illustrates another preferred embodiment of the invention which comprises an ionization gauge. It is built on a conventional vacuum flange 34 which incorporates a vacuum tight electrical plug 35, typically fitted with pins 43 and central spigot 48. In a conventional application, flange 34 is bolted to a second flange 36 which is connected to extension tube 37 on wall 38 enclosing the chamber 39. Chamber 39 is maintained substantially below atmospheric pressure. Gasket 40 is used to seal flanges 34 and 36 which are held together by bolts 41.

Filament supports 42 and 44 are connected to pins 43 in base 35 by tubular connectors 45. Electron emitting filament 2 is fixed to the upper end of support 42 and to another of pins 43 by means of another tubular connector. Thermal-conductivity gauge filament 3 is fixed to support 44 and one of pins 43 in a similar fashion. Grid electrode 46, comprising a coarse spiral of thin wire, is supported on two rods (not shown), also mounted on some of pins 43. Collector electrode 47 comprises a thin wire connected to central spigot 48.

Filament 2, grid 46 and collector electrode 47 comprise a conventional hot cathode ionization gauge and are employed as such when the gauge is used for monitoring pressures below $10^{-3}$ torr. For monitoring pressures greater than $10^{-3}$ torr, filament 3 is employed in the manner described below. Extension tube 37 and filament support 44 act as heat sinks, as required for the operation of filament 3 as a thermal-conductivity pressure gauge.

As explained, it is only possible to incorporate thermal-conductivity gauge filaments in the gauges illustrated in FIGS. 1–4 if they are substantially shorter than conventional thermal-conductivity gauge filaments, for example, those used in a Pirani gauge. In order to overcome the previously explained problem encountered with prior art gauges fitted with short filaments, means (49–54) are provided to maintain the filament temperature substantially constant, and the pressure is measured by means (51, 52, 56–58) adapted to measure the power dissipated in the filament 3.

Figure 5:
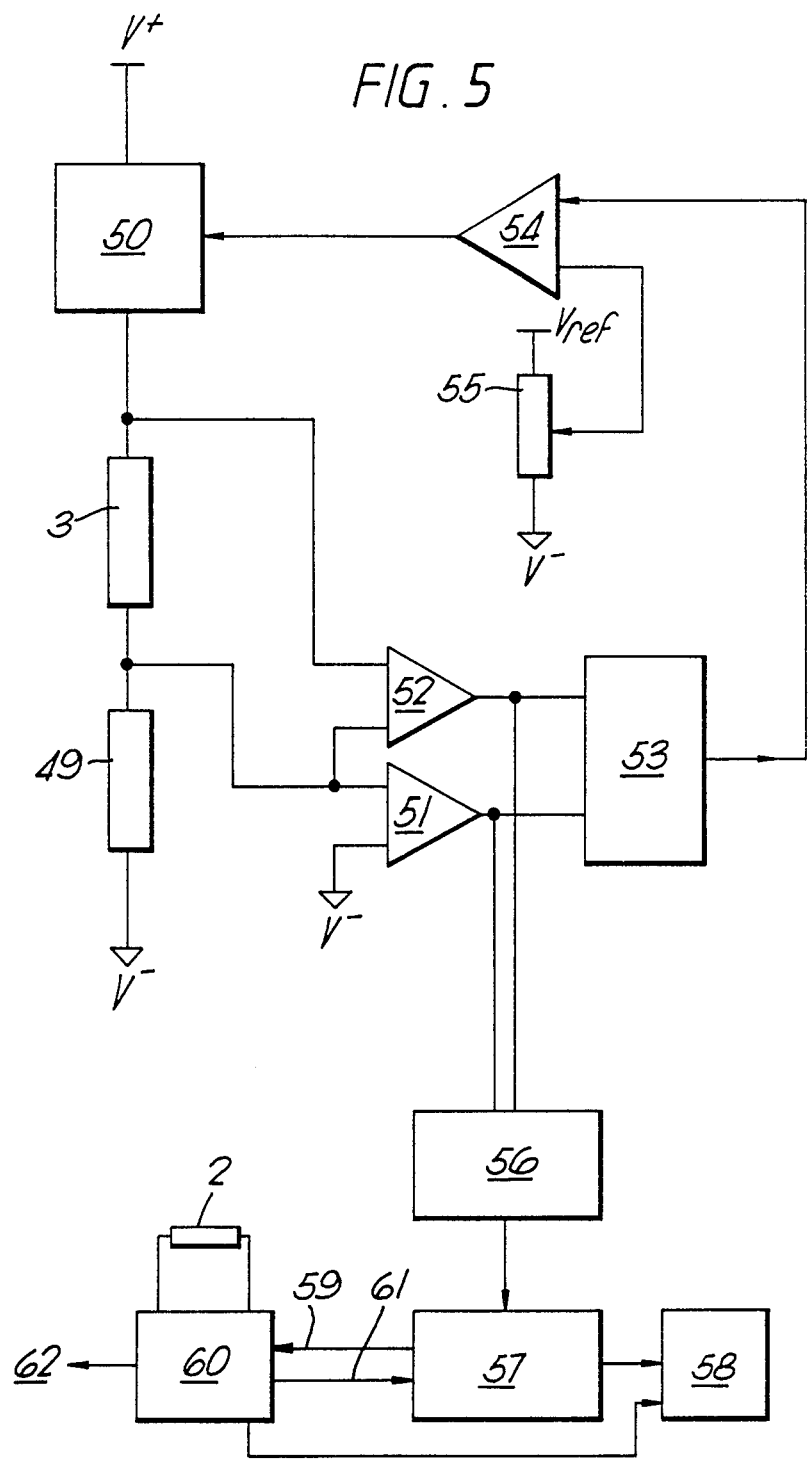
FIG. 5 is a block diagram of a control system suitable for use with the invention.

In FIG. 5, the thermal-conductivity gauge filament 3 is connected in series with a fixed resistor 49 and a current adjusting means 50 across a stabilized voltage supply (not shown). Fixed resistor 49 is comparable to the resistance of filament 3 in its operable pressure range. The voltage appearing across resistor 49 (which is proportional to the current flowing through filament 3) is amplified by an operational amplifier 51. The output of amplifier 51 is applied to one input of an analogue divider 53.

The potential appearing across filament 3 is amplified by another operational amplifier 52 and applied to the other input of divider 53. Divider 53 is adapted to produce an output signal dependent on the quotient of the signals from amplifiers 52 and 51, so that the signal applied to the input of operational amplifier 54 is dependent on the resistance of filament 3. The output of amplifier 54 is applied to the adjusting means 50 so that the complete control loop comprising amplifiers 51, 52 and 54 and divider 53 operates to maintain constant the resistance, and therefore the temperature, of filament 3. Typically, the current adjusting means 50 comprises a power transistor.

Consequently, the heat losses by conduction through supports 31 and 32, and pins 43, are also constant. In this way the linearity and sensitivity of the gauge is improved, as explained. Variable resistor 55 is used to apply an adjustable potential derived from a stable reference voltage $V_{ref}$ to the other input of amplifier 54, allowing the value of the resistance at which the control loop stabilizes to be adjusted, and allowing the operating temperature of filament 3 to be varied.

An output signal indicative of the pressure of gas surrounding filament 3 is obtained by measuring the power dissipated in filament 3, which is dependent on the thermal conductivity, and therfore the pressure, of the gas. The outputs of amplifiers 52 and 51, proportional to the voltage across the filament and the current flowing through it, respectively, are multiplied by analogue multiplier 56. The signal at the output of multiplier 56 is therefore indicative of the pressure of gas surrounding filament 3. This signal is fed to controller 57 and thence to output indicator 58, which may be a meter or a suitably programmed data acquisition system. Controller 57 also incorporates means for comparing the output of 56 with at least one predetermined signal level. If the output of multiplier 56 exceeds this level, controller 57 produces a trip output signal on lead 59 which disables the ionization gauge or mass spectrometer controller 60, preventing power being fed to electron emitting filament 2. Controllers 57 and 60 may also incorporate other systems for disabling other equipment in chamber 39 if the pressure deviates from an acceptable value. Further, the signal on lead 59 may be used to turn on the mass spectrometer or ionization gauge automatically when the pressure in chamber 39 has fallen to a safe value. Controller 60 may be adapted to provide a signal on lead 61 when it is operating normally, and this signal may be used to disable controller 57 so that interference to the operation of the mass spectrometer or ionization gauge by the electrical and magnetic fields associated with filament 3 is prevented. Controller 60 conventionally incorporates means for turning off filament 2 if the pressure exceeds a safe level, and a trip output 62 for controlling other equipment.

Alternatively, operational amplifier 52 can be connected across both filament 3 and resistor 49 as shown in FIG. 6. The control loop comprising amplifiers 51, 52 and 54 and divider 53 then operates to maintain the resistance of filament 3 and resistor 49 constant, which is equivalent to maintaining the resistance of filament 3 constant because resistor 49 is fixed in value. Processor 63 is adapted to first subtract the signal at the output of amplifier 51 (dependent on the voltage across resistor 49) from the signal at the output of amplifier 52 (dependent on the voltage across resistor 49 and filament 3 in series) and then multiply the resultant signal by the output of amplifier 51, thereby producing an output signal proportional to the power dissipated in filament 3. Although requiring a more complicated signal processor than that required by the embodiment shown in FIG. 5, the FIG. 6 embodiment eliminates the need for operational amplifier 52 to have a high common mode rejection ratio, which is inherent in the FIG. 5 embodiment.

It will be appreciated that the design of electronic circuitry to implement the various conventional functions illustrated in FIGS. 5 and 6 will present no difficulty to those skilled in the art. It will be further appreciated that alternative ways of providing the functions achieved by the arrangement of FIG. 5 are also possible and are within the scope of the invention. For example, the analogue signals representing the current through filament 3 and the voltage across it may be digitized and the multiplication and division processes may then be carried out by a microprocessor. Alternatively, a look-up table which relates pressure to the values of the current and potential difference can be compiled (preferably by calibration) and stored in any suitable memory associated with the microprocessor. This eliminates the need for an analogue (or digital) multiplication process.

What is claimed is:

1. Apparatus for measuring the pressure of gases in a chamber maintained substantially below atmospheric pressure, comprising:
   (a) a first filament maintained at a temperature at which it emits electrons and mounted from a flange adapted to fit a port on said chamber;
   (b) means for collecting at least some of the ions formed by collision of said electrons with molecules of said gases;
   (c) a second filament mounted from said flange and adapted for use as the sensing element of a thermal-conductivity vacuum gauge;
   (d) means for passing an electrical current through said second filament;
   (e) means for producing respective signals indicative of the magnitude of said current and the potential difference across said second filament;
   (f) control means responsive to said signals and arranged to vary said current so that the quotient of said potential difference and said current is maintained substantially constant;

(g) means, responsive to said signals and arranged to produce therefrom an output signal indicative of the total pressure of said gases.

2. Apparatus according to claim 1 in which said output signal is proportional to the product of the signal indicative of said current and the signal indicative of said potential difference.

3. Apparatus according to claim 1 further comprising means to prevent the operation of said first filament when said output signal is greater than a predetermined level.

4. Apparatus according to claim 2 further comprising means to prevent the operation of said first filament when said output signal is greater than a predetermined level.

5. Apparatus according to claim 1 in which said first filament and said means for collecting ions comprise a hot cathode ionization gauge.

6. Apparatus according to claim 2 in which said first filament and said means for collecting ions comprise a hot cathode ionization gauge.

7. Apparatus according to claim 5 in which a heat sink is provided adjacent to said second filament.

8. Apparatus according to claim 6 in which a heat sink is provided adjacent to said second filament.

9. Apparatus according to claim 1 in which said first filament and said means for collecting ions comprise a residual gas mass spectrometer.

10. Apparatus according to claim 2 in which said first filament and said means for collecting ions comprise a residual gas mass spectrometer.

11. Apparatus according to claim 3 in which said first filament and said means for collecting ions comprise a residual gas mass spectrometer.

12. Apparatus according to claim 4 in which said first filament and said means for collecting ions comprise a residual gas mass spectrometer.

13. Apparatus according to claim 9 in which said residual gas mass spectrometer further comprises an ionization chamber having a wall, and said second filament is mounted adjacent to said wall in such a way that said wall serves as a heat sink to said second filament.

14. Apparatus according to claim 10 in which said residual gas mass spectrometer further comprises an ionization chamber having a wall, and said second filament is mounted adjacent to said wall in such a way that said wall serves as a heat sink to said filament.

15. Apparatus according to claim 9 in which said residual gas mass spectrometer further comprises a quadrupole mass analyser.

16. Apparatus according to claim 10 in which said residual gas mass spectrometer further comprises a quadrupole mass analyser.

17. Apparatus according to claim 5 in which said second filament comprises gold-plated tungsten wire formed into a coil of between 10 and 40 turns and is operated at approximately 300° C.

18. Apparatus according to claim 6 in which said second filament comprises gold-plated tungsten wire formed into a coil of between 10 and 40 turns and is operated at approximately 300° C.

19. Apparatus according to claim 9 in which said second filament comprises gold-plated tungsten wire formed into a coil of between 10 and 40 turns and is operated at approximately 300° C.

20. Apparatus according to claim 10 in which said second filament comprises a gold-plated tungsten wire formed into a coil of between 10 and 40 turns and is operated at approximately 300° C.

* * * * *